United States Patent
Yamashita et al.

(10) Patent No.: US 9,266,311 B2
(45) Date of Patent: Feb. 23, 2016

(54) MANUFACTURING METHOD OF LAMINATED MAGNET FILM END PRODUCT WITH SELF-BONDING LAYER

(75) Inventors: Fumitoshi Yamashita, Kitasaku-gun (JP); Shinsaku Nishimura, Kitasaku-gun (JP); Noboru Menjo, Kitasaku-gun (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 1343 days.

(21) Appl. No.: 13/091,876

(22) Filed: Apr. 21, 2011

(65) Prior Publication Data

US 2011/0266894 A1 Nov. 3, 2011

(30) Foreign Application Priority Data

Apr. 28, 2010 (JP) ................................ 2010-103839

(51) Int. Cl.
*H01F 3/04* (2006.01)
*H01F 7/06* (2006.01)
(Continued)

(52) U.S. Cl.
CPC ............. *B32B 37/02* (2013.01); *B82Y 25/00* (2013.01); *B32B 2307/208* (2013.01); *B32B 2309/105* (2013.01); *B32B 2311/00* (2013.01)

(58) Field of Classification Search
CPC ........ B23B 7/12; B23B 15/011; B23B 27/04; B23B 27/30; B23B 37/02; B23B 37/04; B23B 37/065; B23B 37/08; B23B 37/16; H02K 37/12; H02K 21/12; Y10T 29/49002; Y10T 29/49009; Y10T 29/49012; Y10T 29/49078
USPC ............... 29/592.1, 596, 598, 605, 606, 609; 310/90, 179, 184, 198, 208, 215, 258, 310/259

See application file for complete search history.

(56) References Cited

U.S. PATENT DOCUMENTS

| | | | |
|---|---|---|---|
| 3,809,989 A | * | 5/1974 | Hays et al. .................... 318/696 |
| 6,731,027 B2 | * | 5/2004 | Ohnishi et al. ............. 310/49.41 |
| 2010/0043206 A1 | * | 2/2010 | Yamashita ...................... 29/598 |

FOREIGN PATENT DOCUMENTS

| | | |
|---|---|---|
| JP | A-9-501820 | 2/1997 |
| JP | B2-3643214 | 4/2005 |

(Continued)

OTHER PUBLICATIONS

Oota et al., "Micro-Electromagnetic Device," 2001, pp. 7(703), vol. 75 (with Abstract).

(Continued)

*Primary Examiner* — Paul D Kim
(74) *Attorney, Agent, or Firm* — Oliff PLC

(57) ABSTRACT

There is provided the manufacturing method of a laminated magnet film end product, including the steps of: a first step of preparing magnet films, each of the magnet films having a thickness of 40 μm to 300 μm, and having a nanocrystalline structure which is magnetically isotropic; a second step of applying a self-bonding resin composition with film formability on each of the magnet films so as to prepare a plurality of self-bonding magnet films, each being composed of a magnet film and a self-bonding layer; a third step of mechanically processing each of the plurality of the self-bonding magnet films so as to be solid or hollow disc; a fourth step of preparing a laminated magnet film by laminating the plurality of self-bonding magnetic films; a fifth step of melting each self-bonding layer of the laminated magnet film and then cooling and solidifying each self-bonding layer so as to integrally rigidify the laminated magnet film; and a sixth step of magnetizing the rigidified laminated magnet film.

16 Claims, 4 Drawing Sheets

(51) Int. Cl.
*B32B 37/02* (2006.01)
*B82Y 25/00* (2011.01)

(56) References Cited

FOREIGN PATENT DOCUMENTS

| JP | B2-3643215 | 4/2005 |
|---|---|---|
| JP | A-2005-210876 | 8/2005 |
| JP | B2-3886317 | 2/2007 |
| JP | B2-4089220 | 5/2008 |

OTHER PUBLICATIONS

Raisigel at al., "Magnetic Planar Micro-Generator," 2004, pp. 942-944.
Nakano at al., "Application of PLD-Made Nd—Fe—B Film Magnets," 2004, pp. 723-728.
Itoh, "Ultra-Small Electromagnetic Motors and Micro-Generators, and Their Application to Micromachines," Journal of the Magnetics Society of Japan, 1994, pp. 922-927, vol. 18 (with Abstract).
Hinz et al., "High Performance NdFeB Magnets with a Thickness of Some 100 µm for MEMS Applications," Institute of Solid State and Materials Research, 2004, pp. 76-83.
Yamashita et al., "Preparing of Thick-Film Nd—Fe—B Magnets by Direct Joule Heating," 2002, pp. 668-674.
Topfer et al., "NdFeB Thick Films for MAGMAS Applications," 2004, pp. 942-949.
Fukunaga et al., "Improvement in Morphology and Magnetic Properties of Thick Nanocomposites Film-Magnets with Multi-Layered Structures," Intermag 2008, pp. 1067.
Kanekiyo et al., "Preparation of Thin-Plate $Fe_3B/Nd_2Fe_{14}B$ Nanacomposite Permanent Magnets," Journal of the Magnetics Society of Japan, 1998, pp. 385-388, vol. 22—No. 4-2 (with Abstract).
Yamashita et al., Relation between the Mechanical Output of a Small Stepping Motor and the Intrinsic Coercivity of an Unsaturated $\alpha$-$Fe/R_2Fe_{14}B$ Nancomposite Bonded Magnet (R=Pr and Nd), Transaction of Magnetic Society of Japan, 2002, pp. 32-35.
Nakano et al., "Proceedings of the Seventeenth International Workshop: Rare Earth Magnets and Their Applications," 2002, pp. 456-460.

\* cited by examiner

Table 1

| X | Coercivity HcJ (kA/m) | Remanence Mr (T) | (BH)max (kJ/m³) |
|---|---|---|---|
| 1 | 656 | 0.96 | 144 |
| 2 | 760 | 0.86 | 116 |
| 3 | 864 | 0.84 | 112 |

100 nm

100 μm

50 μm

MANUFACTURING METHOD OF LAMINATED MAGNET FILM END PRODUCT WITH SELF-BONDING LAYER

BACKGROUND OF THE INVENTION

1. Field of the Invention

The present invention relates to the manufacturing method of a laminated magnet film end product with self-bonding layer that is mainly applied to the rotor of minute rotary electrical machines.

2. Description of the Related Art

Considering miniaturization and weight saving of rotary electrical machines, for example, the rotary electrical machines in the field of information and communication devices, the market expects the rotary electrical machines to be miniaturized and weight-saved up to approximately 40 $mm^3$ in their volumes and 300 mg in their weights. In the torque of these rotary electrical machines, power approximation is established based on a scaling law in the relation of the volume of the rotary electrical machines, thereby causing considerable torque deteriorations. Accordingly, in the rotary electrical machines applied as a driving force of advanced electrical-and-electric equipments in fields of vehicles, information home appliances, communication instruments, precision measuring devices, medical-and-welfare equipments, or robots, torques improvement has been strongly demanded.

For example, Patent Application Publication H09-501820 (Patent Document 1) discloses an intravascular ultrasonic-scanning system for radially air-gap type DC brushless motors with their outer diameters of 1 mm or less and their lengths of 2 mm or less. In the system, a cylindrical main body that has a conductive cylindrical wall with a slot is applied as an excitation winding.

In the minute rotary electrical machines as discussed hereinabove, for example, a $Nd_2Fe_{14}B$ sintered magnet that has been subjected to electrical discharge machining to form a predetermined shape is magnetized with single pole pair in a radial direction of an outer diameter of 0.76 mm. The rotor of an anisotropic bulk magnet is thus obtained. This rotor is then combined with a stator core so as to obtain a rotary electrical machine (DC brushless motor) having the outer diameter of 1.6 mm and the length of 2 mm. See Non-patent document 1. Further, by using the rotor of the anisotropic bulk magnet as discussed hereinabove, H. Raisigel, M. Nakano or Itoh et al. respectively introduce minute rotary electrical machines with the outer diameter of 6 mm and the length of 2.2 mm (see Non-patent Document 2), with the outer diameter of 5 mm and the length of 1 mm (see Non-patent document 3) and with the outer diameter of 0.8 mm and the length of 1.2 mm (see Non-patent document 4).

As regards the rotor of the anisotropic bulk magnet as explained above, for example, an anisotropic $Nd_2Fe_{14}B$ based sintered magnet is ground so as to make its outer diameter to be 0.9 mm. The surface of the magnet is formed with a sputtering layer such as Dy, Tb. The magnet is then subjected to heat treatments for inducing the internal diffusion thereof so as to achieve surface modification. Accordingly, its remanence Mr of the magnet reaches to 1.35 T while its coercivity HcJ recovers up to 1.34 MA/m. Further, its $(BH)_{max}$ reaches to 341 $kJ/m^3$. See Japanese Patent Application Laid-open 2005-210876 (Patent Document 2).

Considering an anisotropic magnetic film, not like the anisotropic bulk magnet discussed hereinabove, D. Hinz et al. introduce a magnetic film that has the thickness of 300 μm, the magnetic film being produced by a die upset method at the temperature of 750° C. This anisotropic magnetic film has the remanence Mr of 1.25 T, the coercivity HcJ of 1.06 MA/m, and the $(BH)_{max}$ of 290 $kJ/m^3$ in a direction perpendicular to the surface of the magnet film. See Non-patent document 5. It is known that this type of the high remanence Mr typed magnet film is applicable as the rotor of the anisotropic magnet film of rotary electrical machines. See Non-patent document 6.

Töpfer and T. Speliotis et al use a $Nd_2Fe_{14}B$-based bonded magnet film as the rotor of an isotropic magnet film, the bonded magnet film being screen-printed on a Fe—Si plate with its diameter of 10 mm where its remanence Mr is 0.42 T, its $(BH)_{max}$ is 15.8 $kJ/m^3$, and its thickness is 500 μm. Rotary electrical machines (stepping motors) that have the torque of 55 μNm are thus achieved. See Non-patent document 7.

On the other hand, by compression-molding compound composed of a binder and crushed powder of a crystallized rapid-solidified film that is magnetically isotropic, a bonded magnet with the density of 6.0 $Mg/m^3$ that has been subjected to thermal hardening is applied as a rotor that has its diameter of 3 mm and six pole pairs. Here, the above-described crushed powder includes nanocomposites that have the coercivity HcJ of 600 kA/m or more, the remanence Mr of 0.94 T or more, and α-Fe phase and $R_2Fe_{14}B$ phase (R is either Nd or Pr) of 60 nm or less. Based on the above, it has been reported that the torque of the rotary electrical machines (the stepping motors) is approximately improved up to 15% compared to the rotor of a $Nd_2Fe_{14}B$ single phase bonded magnet that has the density of 6.0 $Mg/m^3$. See Japanese Patent 4089220 (Patent Document 3).

As noted above, when considering magnets applied to the rotor of the minute rotary electrical machines, the wide range of magnetic properties, for example, the remanence Mr of 0.42 T up to 1.35 T) have been examined. In addition, a variety of materials such as powders, films, or bulks have been also examined.

Here, a specific molten alloy that has a compositional formula of $Fe_{100-x-y}RxAy$ (R is at least one of Pr, Nd, Dy, and Tb; A is C or at least one of B; 1 at. %≤x<6 at. %, 15 at. %≤y≤30 at. %) is subjected to specific rapid-solidified treatments so as to obtain a film that has the thickness of 10 μm to 100 μm, and has more than 90% of amorphousness, the film being in excellent tenacious qualities and having elastically deformable capabilities. The film may be used as it is, or may be cut into a predetermined length, or may be die-cut into an optional shape. The film is then subjected to thermal treatments of 550° C. to 750° C. so as to obtain a nanocrystalline structure with $Fe_3B$ phase and $Nd_2Fe_{14}B$ phase that has an average grain size of 10 nm to 50 nm. Accordingly, a nanocrystalline film is obtained from the amorphous phase where its coercivity HcJ is 160 kA/m or more, and its remanence Mr is 0.8 T or more. At least two of the nanocrystalline films are laminated and adhered to each other by means of epoxy resin. With this method, it would be possible to obtain a high-performable laminated magnet film end product that has optional thickness and desired shape with no grind on films or laminates, or no bonded magnet. See Japanese Patent 3643214 (Patent Document 4).

Further, the following manufacturing method of a laminated magnet has been also known. That is, metal that has a melting point of 200° C. to 550° C. is galvanized or evaporated on the surface of a rapid-solidified film that has the thickness of 10 μm to 100 μm, and that is made of 90% or more of amorphous structures as discussed hereinabove. This rapid-solidified film may be used as it is, or may be processed into a predetermined shape. Then, the rapid-solidified film is laminated and subjected to thermal treatments of 550° C. to 750° C. so as to obtain a nanocrystalline structure with a $Fe_3B$ phase, a α-Fe phase, and a $Nd_2Fe_{14}B$ phase that has an average grain size of 10 nm to 50 nm. The surface of metal layer of the film is also melted at the same time, so that the laminated films become integrated to each other. This manufacturing method of the laminated magnets is disclosed in Japanese Patent 3643215 (Patent Document 5).

Further, considering Patent Document 6 (Japanese Patent 3886317), a Fe-based magnet with its thickness of 200 μm to 300 μm identifiable by the compositional formula of either $Fe_{100-y-z}Co_{10}RyBz$ or $Fe_{100-y-z}Co_{9.5}TM_2RyBz$ is disclosed. In the above formula, TM is an element selectable from at least one of V, Ti Cr, Mn, Cu, Nb, Mo, Wm Ta, Hf and Zr. R is an element selectable from at least one of Nd, Pr. B is boron. And, y and z showing a compositional ratio is $2.5<y<4.0$ and $19<z<25$ at. %. As to physical properties of the magnet, the temperature interval $\Delta Tx$ within undercooled liquid that can be identified by the formula of $\Delta Tx=Tx-Tg$ is 35 C.° or more (here, Tx indicates a temperature that crystallization starts, and Tg indicates a temperature of glass transition). Its reduced vitrification temperature that can be determined by the formula of Tg/Tm is 0.55 or more (Tm indicates the melting temperature of alloy). The magnet is obtainable through a single-roll rapid solidification method, the magnet having its thickness of 200 μm to 300 μm. The volume ratio of its amorphous phase of the magnet is 90% or more. In addition, the magnet is alloy where metallic glass alloy is subjected to heat treatments. The alloy is made of a structure composed of $R_2Fe_{14}B$, $Fe_3B$, α-Fe phase, and a remaining amorphous phase where its average grain size is 50 nm or less. The alloy has magnetic properties as that its remanence Mr is 1 T or more, and its coercivity HcJ is 150 kA/m or more.

LISTS OF NON-PATENT DOCUMENTS (1) Non-Patent Document 1: "MITSUBISHI DENKI GIHO" written by Itsuku OOTA, Takao OHARA, Yukinobu KARATA, and Munehisa TAKEDA, vol. 75, pp. 7(703) (2001);
(2) Non-Patent Document 2: "MAGNETIC PLANAR MICRO-GENERATOR" written by H. Raisigel, O. Wiss, N. Achotte, O. Cugat, and J. Delamare", Annecy, France, pp. 942-944 (2004);
(3) Non-Patent Document 3: "APPLICATION OF PLD-MADE Nd—Fe—B FILM MAGNETS" written by M. Nakano, S. Sato, R. Kato, H. Fukunaga, F. Yamashita, S. Hoefinger and J. Fidler", Annecy, France, pp. 723-728 (2004);
(4) Non-Patent Document 4: "Ultra-Small Electromagnetic Motors and Micro-Generators, and Their Application to Micro-machines" written by T. ITOH and published by Journal of the Magnetics Society of Japan, Vol. 18, pp. 922-927 (1994);
(5) Non-Patent Document 5: "HIGH PERFORMANCE NdFeB MAGNETS WITH A THICKNESS OF SOME 100 μm FOR MEMS APPLICATIONS" written by D Hinz, O. Gutfleisch and K. H. Muller", and published by Institute of Solid State and Materials Research Dresden, Dresden, Germany, pp. 76-83 (2004);
(6) Non-Patent Document 6: "PREPARATION OF THICK-FILM Nd—Fe—B MAGNETS BY DIRECT JOULE HEATING" written by F. Yamashita, M. Nakano, and H. Fukunaga, Newark, Del., US. pp. 668-674 (2002);
(7) Non-Patent Document 7: "NdFeB THICK FILMS FOR MAGMAS APPLICATIONS" written by J. Töpfer, B. Pawlowski, and D. Schabbel, pp. 942-949 (2004);
(8) Non-Patent Document 8: "Improvement in Morphology and Magnetic Properties of Thick Nanocomposite Film-Magnets with Multi-Layered Structure" written by H. Fukunaga, H. Nakayama, M. Nakano, M. Ishimaru, M. Itakura, and F. Yamashita, and published by INTERMAG 2008, FG-06 (2008);
(9) Non-Patent Document 9: "Preparation of Thin-Plate $Fe_3B/Nd_2Fe_{14}B$ Nanocomposite Permanent Magnets" written by Hirokazu KANEKIYO and Satoshi HIROSAWA and published by Journal of the Magnetics Society of Japan, vol. 22, No. 4-2, pp. 385-388 (1998);
(10) Non-Patent Document 10: "Relation between the Mechanical Output of a Small Stepping Motor and the Intrinsic Coercivity of an Unsaturated $\alpha$-$Fe/R_2Fe_{14}B$ Nanocomposite Bonded Magnet (R=Pr and Nd)" written by F. Yamashita, K. Takasugi, H. Yamamoto, and H. Fukunaga and published by Transaction on Magn. Soc. Japan, pp. 32-35 (2002); and
(11) Non-Patent Document 11: "Proc. of $17^{th}$ Int. Workshop on Rare Earth Magnets and Their Applications" written by F. Yamashita, M. Nakano, and H. Fukunaga, Newark, Del., US, pp. 456-460 (2002)

Here, the torque T of rotary electrical machines into which a minute rotor that has the diameter of approximately 2 mm or less according to the present invention is installed can be determined with the following Formula (1): $T=[Pn\times\phi a\times Iq]+[Pn\times(Ld-Lq)\times Id]$ where number of pole pairs are Pn, current is I(Id, Iq), inductance is L(Ld, Lq), and interlinkage flux is φa.

In this Formula (1), a first term on the right hand side indicates magnetic torque while a second term indicates reluctance torque. In rotary electrical machines to which the present invention is targeted, the outer diameter of its rotor has approximately 2 mm or less. Because of limitation due to actual dimensions, the rotor of the laminated magnet film end product according to the present invention is mainly structured with the laminated magnet film but does not have a rotor core. Accordingly, the generating torque T of the rotor of the laminated magnet film will be only magnet torque ($Pn\times\phi a\times Iq$) in the first term on the right hand side. There is no reluctance torque in the second term.

In the Formula (1), the magnet torque will be in proportion to number of pole pairs Pn, interlinkage flux φa, that is, an air-gap flux density φg and the conduction current I of a stator excitation winding. The torque constant Kt (Nm/A) of a motor will be a torque gradient relative to the conduction current I of the stator excitation winding. Here, the higher the Kt, the more rotary driving force to be increased so as to make current control to be facilitated.

Based on the above, in order to prohibit torque reduction along with miniaturization of the rotary electrical machines and to enhance rotary driving force and controllability by further increasing Kt, the following options may be applicable: 1) increasing of number of pole pairs Pn; 2) increasing of air-gap magnetic flux densities; 3) reducing magnetic resistance while expanding air-gap permeance Pg; and enhancing excitation power on a stator side by increasing excitation current Iq or a number of winding n of excitation winding.

Considering a rotor that has its outer diameter of approximately 2.0 mm or less, Patent Document 3, for example, discloses an anisotropic $Nd_2Fe_{14}B$ based sintered magnet, that is, the rotor of an anisotropic bulk magnet with a high remanence Mr. There is however a disadvantage that when the anisotropic bulk magnet is applied to the minute rotor described above, the number of pole pairs Pn needs to be limited to 1.

Accordingly, for enhancing the torque of the rotary electrical machines to which the above-described rotor of the anisotropic bulk magnet is applied, it would be effective to increase the remanence Mr of magnets of the rotor. However, considering the rotor disclosed in Patent Document 3, after the anisotropic $Nd_2Fe_{14}B$ based bulk magnet is subjected to mechanical processing so as to form a predetermined shape, physical deposition such as sputtering may be applied on the surface of the processed magnet forming Dy or Tb on the surface. Mechanical degradation may be recovered through heat treatments improving magnetic properties. Here, its remanence Mr has 1.35 T. Specifically, in the magnetic torque ($Pn \times \phi a \times Iq$) in the first term on the right side of the Formula (1), even if the remanence Mr is supposed to increase up to the theoretical limitation 1.6 T of $Nd_2Fe_{14}B$ intermetallic compound in a condition that the number of pole pairs Pn applying to magnets is 1, the advancement of the torque is limited to less than 1.2 times (exclusive).

On the other hand, a magnetic film disclosed by D. Hinz et al. that has the thickness of 300 μm has high magnetic properties on its surface in a perpendicular direction as that remanence Mr is 1.25 T, coercivity HcJ is 1.06 MA/m, and $(BH)_{max}$ is 290 kJ/m$^3$. See Non-Patent Document 5. However, when considering the rotor of the perpendicular anisotropy magnet, this kind of the rotor is limited to the application for axial air-gap type rotary electrical machines. Here, as to the rotary electrical machines, in relation between the volume Vmm$^3$ and the torque Tm Nm of a DC brushless motor that has the volume of 100 mm$^3$ or less, $T=3 \times 10^{-4} \times V^{1.0922}$ (a correlation coefficient: 0.9924) is established in radial air-gap types while $T=3 \times 10^{-6} \times V^{1.9022}$ (a correlation coefficient: 0.9864) is established in axial air-gap types. As shown, when operation and structure are identical, power approximation will be established between the volume and the torque of the rotary electrical machines.

When comparing the torque between radial air-gap type rotary electrical machines and axial air-gap type rotary electrical machines (both has the volume of 100 mm$^3$), the torque can be determined by 45 μNm and 19 μNm, respectively. Accordingly, it can be said that the radial air-gap type structure can generate the torque twice as much as that of the axial air-gap type structure. Accordingly, in the rotor of the anisotropic magnet film that has a magnet film with anisotropy on its surface in a perpendicular direction, since the rotary electrical machines have the air-gap in its axial direction, it would be difficult to achieve high torques due to permeance deterioration.

In Töpfer et al. and T. Speliotis et al., a spherical $Nd_2Fe_{14}B$ through spinning cup gas atomization is formed to be slurry, and an isotropic magnet film where a screen printing thickness is 100 μm to 800 μm, remanence Mr is 0.42 T, and coercivity HcJ is 760 kA/m is applied as a rotor. Here, remanence Mr is limited less than 40% (exclusive) of the air-gap magnetic flux density φa of the radial air-gap rotary electrical machines that can be obtained from the rotor of anisotropic bulk magnet having high Mr where remanence Mr is 1.35 T. Accordingly, in the radial air-gap rotary electrical machines of Töpfer et al. that is applied to the rotor of the isotropic magnet, it becomes difficult to obtain sufficient torque unless considerably increasing a number of pole pairs Pn, for example, ten pole pairs. Thus, this application may be limited to PM type stepping motors, etc. See Non-Patent Document 7.

In addition, in case of laminating rapid-solidified films where its amorphous layer is 90% or more so as to obtain bulk as shown in Patent Documents 4 and 5, its coercivity HcJ of the film is set to be within 160 kA/m to 568 kA/m. As the same, in case of Patent Document 6, its coercivity HcJ is set to be within 171 kA/m to 284 kA/m. When amorphous phases are crystallized in cases of Patent Document 4, Patent Document 5 and Patent Document 6, a nanocrystalline structure, in which at least 3 phases composed of $Fe_3B$ phase, α-Fe phase, and $Nd_2Fe_{14}B$ phase are mixed, will be produced. The upper limit of a rare-earth element R that forms a hard magnetic phase will be thus 6 at. % (See Patent Document 4 and Patent Document 5). Or, the upper limit of the rare-earth element R becomes 4 at. % (See Patent Document 6). As a result, the stoichiometry of $Nd_2Fe_{14}B$ intermetallic compound that forms the hard magnetic phase becomes half or one third, considerably reducing the proportion of $Nd_2Fe_{14}B$ phase.

In technology to form a bulk by, for example, laminating rapid-solidified films where their amorphous phases are 90% or more, as shown in Patent Document 4, Patent Document 5 and Patent document 6, there is a case that coercivity HcJ for the rotor of rotary electrical machines to which the present invention is targeted is decreased. For example, the magnetic flux deterioration of the rotor due to temperature increase during operation, or the magnetic flux deterioration of the rotor due to reverse magnetic fields from excitation winding when a rotary shaft is restrained may be named. When demagnetization of proof stress is not sufficient as the rotor of the rotary electrical machines, reliability on the rotary electrical machines may be deeply impaired.

When considering the rotor of radial air-gap type rotary electrical machines like general PM type stepping motors as well as brush-less motors where an electrical insulation class is class E (120° C.), the level of coercivity HcJ necessary to maintain demagnetizing proof stress is 600 kA/m or more. In case that the coercivity HcJ is less than the above value, even if remanence Mr is high, it may lose advantageous effects to improve torque of the rotary electrical machines due to magnetic flux deterioration. See Non-Patent Document 1. Based on this reason, as the same with Non-Patent Document 7, the level of coercivity HcJ is set to 600 kA/m or more.

The level of coercivity HcJ that is necessary as the rotor of the rotary electrical machines depends on the structure or the driving condition of the rotary electrical machines. However, in the fact that the level of coercivity HcJ is less than 600 kA/m (exclusive) as disclosed by Patent Document 4, Patent Document 5 and Patent Document 6, it can be concluded as that the rotors disclosed by these Patent Documents are not appropriate in the application of the rotary electrical machines.

In the above conventional arts, for example, Patent Document 3, when the anisotropic bulk magnet with the remanence Mr of 1.35 T is applied to a rotor, there is restriction as that number of pole pairs are limited to one in parallel magnetization. Further, even if its remanence Mr can be improved, it would be not possible to have torque exceeding 120%.

In case that the perpendicular anisotropy magnet film, where its thickness is 300 μm, and its remanence Mr is 1.25 T as shown in Non-Patent Document 5, is applied to a rotor, the application of the rotor is limited to the axial air-gap rotary electrical machines that decreases torque in comparison to the radial air-gap types.

When the isotropic magnet film fabricated form the screen printing shown in Non-Patent Document 7 where its remanence Mr is 0.42 T is applied to a rotor, the application of the rotor is limited to the PM type stepping motor for compensating the deficiency of remanence Mr, for example, by providing ten pole pairs Pn.

In addition, when a rapid-solidified film where its amorphous phase is 90% or more is processed and laminated so as to produce bulk, and when the bulk is crystallized so as to apply as a rotor, the proportion of a hard magnetic phase may be deteriorated because the amorphous film needs to retain superior toughness and elastic deformability. Accordingly, this may cause considerably large negative impacts on the reliability of the rotary electrical machines such as torque deteriorations due to magnetic flux loss.

SUMMARY OF THE INVENTION

The present invention has been made in light of the above problems, and it is an object of the present invention to provide the manufacturing method of a laminated magnet film end product, and the rotor or the motor of the rotary electrical machines that are provided with the laminated magnet film end product. In Patent Document 4, Patent Document 5 and Patent Document 6, the rapid-solidified film with its amorphous phase of 90% or more is mechanically processed, laminated and formed into bulk to obtain magnet films in a predetermined formation. However, in the present invention, a magnet film that has a magnetically isotropic nanocrystalline structure and coercivity HcJ of 600 kA/m or more is made to be either solid or hollow. By laminating the magnet films and obtaining bulk, it makes possible to achieve high torque in the rotary electrical machines.

In order to achieve the object described above, according to the first aspect of the present invention, there is provided a manufacturing method of a laminated magnet film end product, comprising the steps of: a first step of preparing a magnet film that has a thickness of 40 μm to 300 μm, and has a nanocrystalline structure which is magnetically isotropic; a second step of applying a self-bonding resin composition coated on the magnet film so as to prepare a self-bonding magnet film that is magnet film and a self-bonding layer; a third step of mechanically processing the self-bonding magnet film so as to be solid or hollow; a fourth step of preparing the laminated magnet film by laminating the plurality of self-bonding magnet films either solid or hollow; a fifth step of melting the self-bonding layer of the laminated magnet film and then cooling and solidifying the self-bonding layer so as to integrally rigidify the laminated magnet film; and a sixth step of magnetizing the rigidified laminated magnet film.

In the first aspect of the present invention, the first step is further defined as that a metallic structure of the magnet film is fabricated to have a nanocrystalline structure by that: R-TM-B (R is either Nd or Pr, and TM is either Fe or Co) based molten alloy is rapidly solidified, or R-TM-B (R is either Nd or Pr, and TM is either Fe or Co) based alloy is filmed by means of a physical deposition; the treated alloy is then subjected to heat treatment for crystallization; and the magnet film is made to have a nanocrystalline structure where $R_2TM_{14}B$ phase of the magnet film is provided with hard magnetic properties.

In the first aspect of the present invention, the first step is further defined as that a metallic structure of the magnet film is fabricated to have a nanocrystalline structure by that: a rapid-solidified film of R-TM-B (R is either Nd or Pr, and TM is either Fe or Co) based molten alloy is subjected to heat treatment; and the magnet film is fabricated to have α-Fe phase and $R_2TM_{14}B$ phase (R is either Nd or Pr, and TM is either Fe or Fe partially substituted by Co).

In the first aspect of the present invention, the sixth step is further defined as that magnetic properties of the magnet film have coercivity HcJ of 600 kA/m or more and remanence Mr of 0.9 T or more after pulsed magnetization of 4 MA/m.

In the first aspect of the present invention, the first step is further defined as that a metallic structure of the magnet film is fabricated to have a nanocrystalline structure by that a rapid-solidified film of $Pr_9Fe_{74-x}Co_9V_1NbxB_7$ (x=1 to 3) molten alloy is subjected to heat treatment.

In the first aspect of the present invention, the first step is further defined as that a metallic structure of the magnet film is fabricated to have a nanocrystalline structure which is composed of $Fe_3B$ phase, α-Fe phase or $R_2TM_{14}B$ phase (R is either Nd or Pr, and TM is either Fe or Fe partially substituted by Co).

In the first aspect of the present invention, the sixth step is further defined as that magnetic properties of the magnet film have coercivity HcJ of 300 kA/m or more and remanence Mr of 1.1 T or more after pulsed magnetization of 4 MA/m.

In the first aspect of the present invention, the first step is further defined as that a metallic structure of the magnet film is fabricated to have a nanocrystalline structure by that a rapid-solidified film of $Ndr_{4.5}Fe_{7.0}CO_5B_{18.5}Cr_2$ molten alloy is subjected to heat treatment.

In the first aspect of the present invention, the second step is further defined as that a main component of the resin composition of self-bonding layer includes at least one polymer that has a functional group reactable to an isocyanate group.

In the first aspect of the present invention, a blocked-isocyanate is added into the resin composition.

In the first aspect of the present invention, the second step is further defined as that the laminated magnet film is integrally rigidified by which the self-bonding layer is cross-linked.

In the first aspect of the present invention, the third step is further defined as that the mechanical processing for the self-bonding magnet film is conducted through a punching work by an opposed dies method.

In the first aspect of the present invention, the second step is further defined as that the laminated magnet film end product is fabricated so as to make a relative density of the magnet film in 100% of the laminated magnet film to be 85% or more.

In the first aspect of the present invention, the sixth step is further defined as that the magnetization is performed along an in-plane direction of the laminated magnet film so as to have at least double pole pairs.

In a second aspect of the present invention, there is provided a radial air-gap type rotary electrical machine wherein the laminated magnet film end product manufactured by the method recited in claim 1 is magnetized so as to have at least double pole pairs; and a rotary shaft is installed into the laminated magnet film end product so as to be applicable as a brushless DC motor.

In a third aspect of the present invention, there is provided a radial air-gap type rotary electrical machine wherein the laminated magnet film end product manufactured by the method recited in claim 1 is magnetized so as to have at least four pole pairs; and a rotary shaft is installed into the laminated magnet film end product so as to be applicable as a stepping motor.

In the present invention, rapid-solidified films that have amorphous phase of 90% or more have superior toughness and elastically deformable capabilities. In the present invention, the films may be used as they are, may be cut into a predetermined length, or may be punched to have optional shapes. However, the films are not crystallized in the following step, instead, a resin composition with film formability is applied on the magnet film of a nanocrystalline structure that has been cut into optional pieces as necessary so as to obtain self-bonding magnet films. The self-bonding magnet films are mechanically processed into a solid or hollow shape. The self-bonding magnet films are then laminated and integrated to form bulk.

The magnet film of the present invention is not limited to the rapid-solidified films of R-TM-B based molten alloy (R is either Nd or Pr, and TM is either Fe or Co). In the present invention, the molten ally may be subjected to film formation by means of physical deposition and crystallized by heat treatments as necessary so as to obtain a nanocrystalline structure including a soft magnetic phase to which a hard magnetic phase is given at a $R_2TM_{14}B$ phase.

Even if the magnet film is the nanocrystalline structure of either $Fe_3B$ phase, $\alpha$-Fe phase or $R_2TM_{14}B$ phase (R is either Nd or Pr, and TM is either Fe or Fe partially substituted by Co), coercivity HcJ at a room temperature is 300 kA/m or more after pulsed magnetization of 4 MA/m, and remanence Mr is 1.1 T or more, as long as reliability can be obtained as the rotor of the rotary electrical machines, the magnet film is applicable in the present invention. Alloy composition that can achieve the above magnetic properties may be $Ndr_{4.5}Fe_{70}CO_5B_{18.5}Cr_2$.

Here, the main component of the self-bonding resin composition that has film formability is at least one of polymer that has a functional group reactable to an isocyanate group, and blocked-isocyanate optionally added as necessary. It is preferable that the mechanical process of the self-bonding magnet film is performed by punching through an opposed die method, and the relative density of the laminated magnet film is 85% or more of the true density of magnet film.

Processes of magnetizing laminated magnet films in an in-plane direction so as to obtain double pole pairs; and installing a rotary shaft is added. Through the processes, a radial air-gap type rotary electrical machines that perform rotary operations as a brushless motor can be provided. Here, it may add four pole pairs so as to obtain a radial air-gap type rotary electric machines that perform rotary operations as a stepping motor.

Further, in the magnet film of the present invention, thermal-treating may be optionally applied to the rapid-solidified film of R-TM-B based molten alloy (R is either Nd or Pr, and TM is either Fe or Co) so as to obtain nanocrystalline structures based on $\alpha$-Fe phase and $R_2TM_{14}B$ phase (R is either Nd or Pr, and TM is either Fe or Fe partially substituted by Co). By setting its coercivity HcJ to be 600 kA/m or more and its remanence Mr to be 0.9 T or more after pulsed magnetization of 4 MA/m, it makes possible to obtain reliability on the rotor of the rotary electrical machines. Here, as alloy composition achieving the above magnetic properties, $Pr_9Fe_{74-x}Co_9V_1Nb_xB_7$ (x=1~3) may be exemplified.

Hereinafter, effects of the present invention will be briefly discussed. In the present invention, a predetermined magnet film with magnetically isotropic nanocrystalline structures where its coercivity HcJ is 600 kA/m ore more is made to have solid or hollow. The magnet film is laminated so as to form bulk whereby it would be possible to extend application available for the high torque of the rotary electrical machines.

Further, in the laminated magnet film end product of the present invention, unlike Patent Document 4, Patent Document 5 and Patent Document 6, there is no restriction to the amount of rare-earth elements R (either Nd or Pr) due to constraint of processing. This means that there is no limitation in the proportion of hard magnetic phases. Accordingly, as the rotor of the rotary electrical machines, it can prevent torque deterioration due to the loss of rotary operation functions or the loss of magnetic flux so as to improve reliability in the structure of the rotary electrical machines.

Accordingly, in the rotary electrical machines with a rotor having a laminated magnet film end product according to the present invention, since it can improve the torque of minute rotary electrical machines, its application is extendable to a radial air-gap type DC brushless motor, a PM type stepping motor or a generator, thereby functionally advancing variable electrical and electric equipments in fields of information devices, medical devices or industrial devices.

DETAILED DESCRIPTION OF THE PREFERRED EMBODIMENTS

First, a magnet film made of a nanocrystalline structure according to the present invention will be described. As a hard magnetic phase that structures the magnet film of the present invention, $R_2TM_{14}B$ (R is either Nd or Pr in rare-earth elements, and TM is either Fe or Co in transition metal elements) may be exemplified. In case that a soft magnetic phase such as $\alpha$-Fe having a high saturation magnetization in which to exchange-couple with the hard magnetic phase exists, flux reversal will occur first from the soft magnetic phase under reversed fields so as not to be able to obtain high coercivity HcJ. However, by reducing the size of the soft magnetic phase less than the width of magnetic domain wall, it would be possible to inhibit heterogeneous flux reversal in reversed fields. Accordingly, since the magnetic anisotropy Ha of the hard magnetic phase starts to control coercivity HcJ, the reduction of coercivity HcJ becomes achieved. Moreover, in order to obtain further high magnetic flux from the soft magnetic phase, it would be necessary to increase the volume ratio of the soft magnetic phase in a magnet. For achieving this, the size of the hard magnetic phase needs to be minimized. It is preferable to reduce the size of the hard magnetic phase less than the width of magnetic domain wall; however, the maintenance of coercivity HcJ will be difficult if the width is too narrow. Based on the above, it would be the best to make the size of the hard magnetic phase to be approximately the width of magnetic domain wall. Here, the width of magnetic domain wall may be estimated by $\pi(A/Ku)^{1/2}$ (A is Exchange Stiffness Constant, and Ku is Magnetic Anisotropic Energy).

Figure 1A:
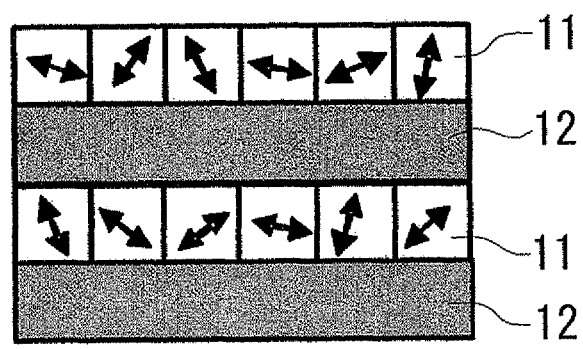
FIGS. 1A and 1B are schematic diagrams that show nanocrystalline structures of a soft magnetic phase and a hard magnetic phase.
Figure 1B:
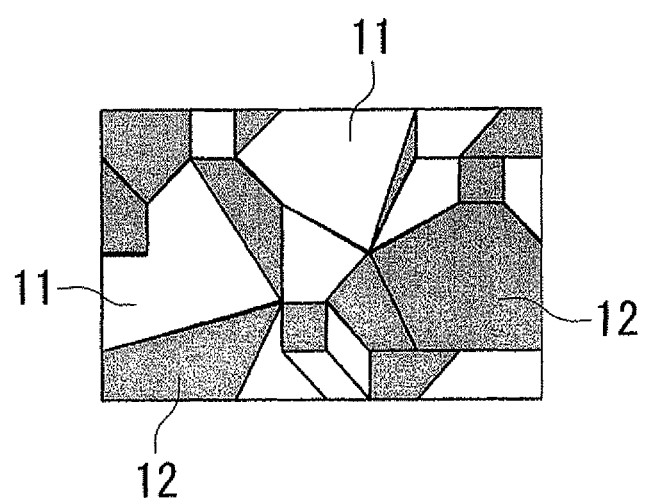

When considering the concrete configuration of nanocrystalline structures according to the present invention, as shown in FIG. 1A (a multilayered magnet film), the soft magnetic phase is determined by $\alpha$-Fe and the hard magnetic phase is determined by $Nd_2Fe_{14}B$ where the soft magnetic phase is set to 60 nm or less and the hard magnetic phase is set to several nm. Further, the hard magnetic phase 11, the thickness of which is less than the one of the soft magnetic phase ($\alpha$-Fe), is alternately laminated by the soft magnetic phase 12 at $10^3$ or more. Or, as shown in FIG. 1B, the soft magnetic phase 12 and the hard magnetic phase 11, both thickness of which are defined within 10 nm to 50 nm, are randomly dispersed. The above magnetic layers are identifiable as magnetically isotropic.

In addition to the above, in the multilayered magnet film of FIG. 1A, $\alpha$-Fe and $Nd_2Fe_{14}B$ may be laminated on a non-magnetic substrate such as Ta through PLD (Pulsed Laser Deposition). See Non-Patent Document 8. Further, as regards the magnet film as shown in FIG. 1B where the soft magnetic phase 12 and the hard magnetic phase 11 are randomly dispersed, a magnet film that has three phases of FeB, $\alpha$-Fe and $Nd_2Fe_{14}B$ and that is made through the rapid solidification of molten alloy may be exemplified. See Non-Patent Document 9. In addition, a magnet film composed of $\alpha$-Fe and $Pr_2Fe_{14}B$ may be also exemplified. See Non-Patent Document 10.

Here, as shown in FIGS. 1A and 1B, the magnetically isotropic magnet film composed of nanocrystalline structure that is adjusted to approximately 20 nm can have further high remanence Mr through remanence enhancement. Especially, through a computer analysis in a condition that sufficient magnetic coupling is applied on a contact interface between $\alpha$-Fe and $R_2TM_{14}B$, and the thickness of $\alpha$-Fe layer and $R_2TM_{14}B$ layer is reduced to approximately the width of magnetic domain wall through a nanocrystalline control, it is expected to receive approximately 200 $kJ/m^3$ of $(BH)_{max}$ by making a uniform nanocrystalline structure, the grain size of which is approximately 10 nm.

As discussed hereinabove, as regards the magnet film of the present invention, R-TM-B based molten alloy (R is either Nd or Pr, and TM is either Fe or Co) is rapidly solidified, or the soft magnetic phase such as $\alpha$-Fe and the above molten alloy are physically laminated through the physical film formation. These are then crystallized so as to obtain the nanocrystalline structure that generates hard magnetic properties. Here, the process of crystallization may be eliminated as necessary.

Next, a self-bonding resin composition of the present invention that has film formability will be explained. The self-bonding resin composition with film formability according to the present invention can be identified as follows: it has a functional group in its molecule reactable to an isocyanate group (—N=C=O); it has at least one of polymer having film formability; and as necessary, at least one of a blocked-isocyanate is added. Here, when the laminated magnet film of the present invention is hardened for integration, the self-bonding layer (polymer) needs to be re-melted by heat.

As to the functional group in molecule reactable to the isocyanate group, the following may be exemplified: —OH, —COOH, —NHCO—, —NHCOO—, —NHCONH—, —NH$_2$, —NHNH$_2$, —SH, —CHS, —CSOH, active methylene, and etc. As long as the polymer has the above functional groups and is provided with film formability, any of the polymer may be satisfiable. Here, the most preferable functional group among the above will be the one with —OH, —NHCO—, —NHCOO—, or —NHCONH—, and the polymer needs to have film formability as well as the property that is re-melted by heat.

As to the above-described polymer, there are polyether, polyesterester, polyesterimide, polyacetal, epoxy resin where there are alcoholic hydroxyl groups in their molecules. Further, there may be phenolic resin, melamine resin, benzoguanamine resin, and xylene resin. Still further, polyester-amide-imide, polyamidimide, polyurethane, polyurea, etc. may be applicable.

Among polymers that have a functional group in their molecules reactable to an isocyanate group, polyether is obtainable from, for example, a bisphenol group (-A, -F, etc.) and epichlorohydrin, or the bisphenol group (-A, -F, etc.) and substituted epichlorohydrin. See Formula 1.

[Formula 1]

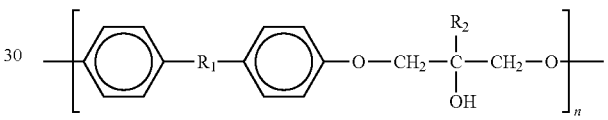

Here, in Formula 1, $R_1$ can be identified by -O-, —S—, —SO—, $SO_2$—, or —$C_pH_{2p}$ (p is integer) such as —$CH_2$—, —$CH_2CH_2$—, —$C(CH_3)_2$; and $R_2$ can be identified by —H, or $C_qH_{2q+1}$ (q is integer) such as —$CH_3$, —$C_2H_5$ and the like. Here, in the most preferable case, $R_1$ will be —$C(CH_3)_2$—, and $R_2$ will be —H. Of course, copolymers of these are applicable.

Among polymers that have a functional group in their molecules reactable to an isocyanate group, polyesterester is identifiable based on Formula 2.

[Formula 2]

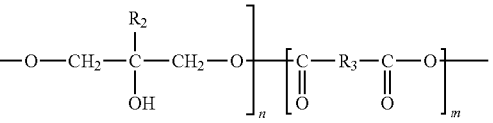

In Formula 2, $R_1$ and $R_2$ are the same with the case of the above polyesterester, and $R_3$ is identifiable based on Formula 3.

[Formula 3]

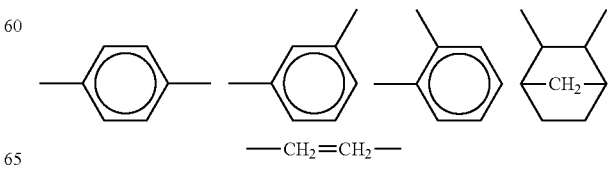

Among polymers that have a functional group in their molecules reactable to an isocyanate group, polyacetal is obtainable from, for example: polyvinyl alcohol; polyvinyl formal; polyvinyl butyral; and the like. In addition, among polymers that have a functional group in their molecules reactable to an isocyanate group, epoxy resin is obtainable from, for example, a bisphenol group and epichlorohydrin, or condensation between the bisphenol group and substituted epichlorohydrin, or other variable methods. For example, see the general formula of Formula 4. R1 and R2 are the same with the above.

that stabilizes an isocyanate group with a compound having an alcoholic hydroxyl group in its molecule (hereinafter, the first stabilized polyisocyanate), or a stabilized polyisocyanate that stabilizes an isocyanate group with a compound not having an alcoholic hydroxyl group in its molecule (hereinafter, the second stabilized polyisocyanate). Here, the first stabilized polyisocyanate is obtainable from polyisocyanate and polymer obtained through the reaction of alcoholic hydroxyl group. The polyisocyanate of the above may be exemplified by diisocyanate, 2,4-tolyloenediisocyanate, 2,6-tolyloenediisocyanate, cyclopentylenediisocyanate, m-phe-

[Formula 4]

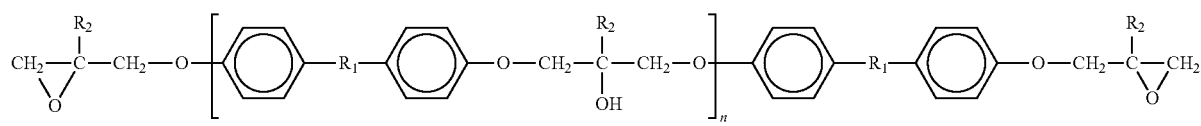

Among polymers that have a functional group in their molecules reactable to an isocyanate group, phenolic resin is obtainable from, for example, a compound having a phenolic hydroxyl group such as phenol, cresol, xylenol, p-t-butylphenol, dihydroxydiphenylmethane, bisphenol A, or formaldehyde, or a reaction product with a compound having an aldehyde group such as furfural, or partially reformed polymers of these. In addition, xylene resin is obtainable from a reaction product with a compound having a aldehyde group such as formaldehyde, or by applying phenol reformation, alkylphenol reformation or amine reformation to the reaction product.

Among polymers that have a functional group in their molecules reactable to an isocyanate group, polyamide is obtainable from lactam as homopolyamide, polymers synthesized by aminocarboxylic acid, diamine and dicarboxylic acid, or these synthesized from ester or halide. See general formulas of Formula 5 and Formula 6.

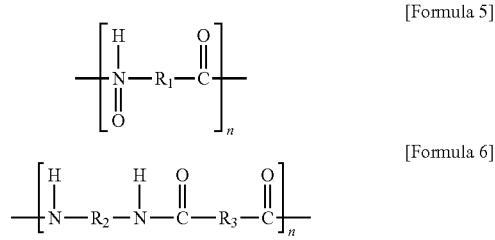

[Formula 5]

[Formula 6]

Here, in the formula 5 and formula 6, $R_1$, $R_2$ and $R_3$ are generally a polymethylene group. When $R_1$ is (—CH2-)m, it indicates nylon (m+1). When $R_2$ is (—CH2-)p or $R_3$ is (—CH$_2$-)q-2, they indicate nylon –p·q. Further, copolymer where the third monomer is added is applicable.

Among polymers that have a functional group in their molecules reactable to an isocyanate group, polyester is obtainable from, for example, polyester having a hydroxyl group at the end of its molecular chain or within the molecular chain, aromatic dibasic acids or their esters, polyethylene terephthalate obtained from halide of the aromatic dibasic acids and fatty-acid dihydric alcohol, and polybutylene terephthalate. Or, poly-1,4-cyclohexylene terephthalate where alicyclic is introduced into the dihydric alcohol may be one option. Further, copolymers of these may be applied.

Next, the isocyanate regeneration body according to the present invention means either a stabilized polyisocyanate nylenediisocyanate, p-phenylenediisocyanate, ethylenediisocyanate, butylidenediisocyanate, 1,5-naphthalenediisocyanate, 1,6-hexamethylenediisocyanate, 4,4'-diphenylmethanediisocyanate, 4,4'-diphenyletherdiisocyanate, xylenediisocyanate. Further, as to isocyanate with trivalent or more may be exemplified by the cyclic trimer of 2,4-tolyloenediisocyanate, the cyclic trimer of 2,6-tolyloenediisocyanate or the cyclic trimer of 4,4'-diphenylmethanediisocyanate. For example, trifunctional isocyanate trimer such as a methyl group, an ethyl group, an n-propyl group, an isopropyl group, an n-butyl group, etc; 1,3,5-triisocyanatebenzene; 2,4,6-triisocyanatetoluene; a reaction product between diisocyanate and multivalent alcohol sufficient to react to one half or more of an isocyanate group; and a reaction product between 3 mol of hexamethylenediisocyanate and 1 mol of water may be named. These reaction products may be a bullet form.

As to composition having the alcoholic hydroxyl group, aliphatic alcohol such as methyl alcohol, ethyl alcohol, n-propyl alcohol, iso-propyl alcohol, or n-butyl alcohol; alicyclic alcohol such as cyclohexylalcohol, or 2-methylcyclohexylalcohol; and monovalent alcohol such as benzyl alcohol, Phenyl cellosolve, or furfuryl alcohol may be named. In addition, multivalent alcohol derivative such as ethyleneglycolmonoethylether, ethyleneglycolisopropylether, or ethyleneglycolmonobutylether may be exemplified. Further, as to the second stabilized polyisocyanate, phenolics or active methylene compounds, etc. may be exemplified. Considering the phenolics, phenol, cresol, xylenol, p-ethylphenol, o-isopropylphenol, p-t-butylphenol, p-t-octylphenol, p-catechol, resorcinol, etc. may be named. As to the active methylene compounds, dimethyl malonate, diethyl malonate, methyl acetoacetate, acetoacetic ester, etc. may be named.

As discussed hereinabove, the self-bonding resin composition with film formability of the present invention has a main component of: 1) at lease one polymer that has a functional group reactable to an isocyanate group; and 2) the blocked-isocyanete optionally added as necessary. The resin composition is coated on the surface of the magnet film made of nanocrystalline structures. The method of coating the resin composition may be a direct coating of polymer solutions through a doctor blade, or a coating/baking of organic solvent of polymer. Further, the preferable thickness of the self-bonding layer is one tenth or less than one tenth of the thickness of the magnet film. In case that the thickness of the above layer exceeds one tenth of the one of the magnetic film, it would be difficult to make the relative density of the laminated magnet film relative to real density to be 85% or more.

Figures 2, 3:
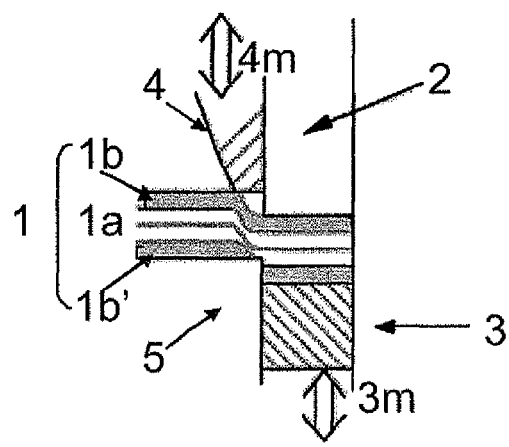
FIG. 2 is a schematic diagram of an opposed-dies punching method.
FIG. 3 is a table that shows magnetic properties of a magnet film after pulsed magnetization according to the embodiment of the present invention.

Next, mechanical works of the laminated magnet film end product according to the present invention will be explained. As the mechanical works, ultrasonic process, micro-blasting process, etc. are applicable. More preferably, punching process using a precision cutting die such as a fine blanking method or a shaving method, etc. may be chosen. A precision cutting process through an opposed dies method as shown in FIG. 2 may be the best choice. In FIG. 2, a reference numeral 1 is a self-bonding magnet film, a reference numeral 1a is a magnet film made of nanocrystalline structures, reference numerals 1b and 1b' are self-bonding layer having film formability, a reference numeral 2 is a punch, a reference numeral 3 is an ejector, a reference numeral 3m indicates a direction in which the ejector is movable (hereinafter the ejector movable direction), a reference numeral 4 is a die with a projection (hereinafter indicated by the partially projected die), a reference numeral 4m indicates a direction in which a die is movable (hereinafter indicated by the die movable direction), and a reference numeral 5 is a die.

The opposed dies punching process for the self-bonding magnet film 1 according to the present invention will be explained. First, the partially projected die 4 is shifted in a die movable direction 4m so as to fix the self-bonding magnet film 1 along with the die 5. Subsequently, the ejector 3 is shifted in an ejector movable direction 3m so as to punch the pinched portion along with the punch 2. Here, it would be preferable that a clearance between the punch 2 and the dies 5 is set to one tenth or less than one tenth of the thickness of the magnet film 1a so as to reduce the occurrence of microcracks of the magnet film 1a. Here, it seems to be impossible to reduce cracks occurred in the punching process of the magnet film 1a having the nanocrystalline structures to be none. However, the self-bonding layer 1b, 1b' with film formability according to the present invention can provide operational effects like "laminated (or sandwich) glass" to the magnet film 1a, the "laminated glass" being composed of two pieces of flat glasses that are laminated to each other. The laminated glass according to the present invention will be further explained in detail. One example of the laminated glass is that glasses are laminated and bonded to each other by means of polyvinyl alcohol and the like, the polyvinyl alcohol being one of the polymers that have a functional group reactable to an isocyanate group. With this, it would be possible to obtain advantageous function effects in the opposed dies punching process such as increase of anti-shock properties or penetration resistance properties, and reduction of chips that are occurred due to cracks. Especially, since a functional group reactable to an isocyanate group, such as the self-bonding layer 1b, has a strong polarity in general, it would be possible to firmly bond the magnet film 1a. Thus, unnecessary fragmentation or fracture of the self-bonding magnet film 1 can be prevented, so that solid or hollow self-bonding magnet films with predetermined dimension according to the present invention are obtainable. Here, the self-bonding magnet film 1 is indicated as that the magnet film 1a is one piece; however, it can be of course as that the self-bonding magnet film 1 is formed with the plurality of magnet films 1a according to the thickness of the magnetic film 1a.

After the predetermined number of the solid or hollow self-bonding magnet films according to the present invention are laminated, the self-bonding layer 1b, 1b' with film formability are melted and solidified at the low pressure of 50 MPa and the like. Accordingly, the laminated magnet film integrally solidified can be obtained.

Here, by optionally adding the blocked-isocyanate to the self-bonding layer 1b, 1b' having film formability and also by setting its temperature to be more than the thermal dissociation of active hydrogen compounds that have been added into the isocyanate group, the isocyanate group that has been disengaged due to the thermal dissociation will be crosslinked with at least one functional group of polymers having film formability. Accordingly, it would be possible to improve mechanical strength, thermal stability, chemical resistance, etc. of the laminated magnet films. As regards the loadings of the blocked-isocyanate, it is preferable that the ratio of the equivalence of an isocyanate group (—N═C═O) and the equivalence of the functional group of polymer is 1 or less, more preferably, 0.8 or less. This is because that when the blocked-isocyanate is heated to the temperature more than the thermal dissociation, the amount of the active hydrogen compounds that have been thermal-dissociated will be increased, deteriorating adhesive strength.

Since the blocked-isocyanate is chemically inactive at the temperature less than the thermal dissociation, the solid or hollow self-bonding magnet film can be kept for a long period without any deterioration due to crosslinking reactions. It makes thus possible to stably manufacture, even in an industrial scale, the self-bonding magnet films that have the thickness of 40 µm to 300 µm and have magnetically isotropic nanocrystalline structures.

Although the self-bonding magnet films according to the present invention are magnetically isotropic, due to the formation of laminated structures, it can apply to a radial air-gap rotary electrical machine that performs the rotary operation of a DC brushless motor by applying in-plane magnetization which has less magnetic resistance, by providing at least double pole pairs and by mounting a rotary shaft. Or, with at least four pole pairs, it makes possible to apply to a radial air-gap rotary electrical machine that performs the rotary operation of a PM type stepping motor.

The present invention will be hereinafter explained in further detail based on embodiments. The present invention is however not limited to these embodiments.

First, 10 g of molten alloy loading to a quartz crucible (alloy composition of $Pr_9Fe_{74-x}Co_9V_1Nb_xB_7$ where x=1 to 3) is rapidly solidified on the surface of Cr-plated Cu roll that rotates at the circumferential velocity of 15 m/sec under 10 MPa of argon gas atmosphere through an orifice, the diameter of which is 0.8 mm. The molten alloy then becomes an amorphous film that has its width of 2.5 mm and its thickness of 40 µm to 50 µm.

Next, in $10^{-4}$ Torr of a vacuum circumstance, the temperature of the amorphous film is increased up to 650° C. at the temperature increase rate of 200° C./min. The temperature of the amorphous film is then cooled off to 100° C. or less with no holding time. A table 1 indicates post-thermal treating magnetic properties after 4.8 MA/m pulse magnetization is applied to $Pr_9Fe_{74-x}Co_9V_1Nb_xB_7$ (x=1 to 3) magnet films in their in-plane directions. When x=1, remanence Mr is 0.96 T, coercivity HcJ is 656 kA/m, and the maximum energy product $(BH)_{max}$ is 144 kJ/m$^3$.

Figure 4:
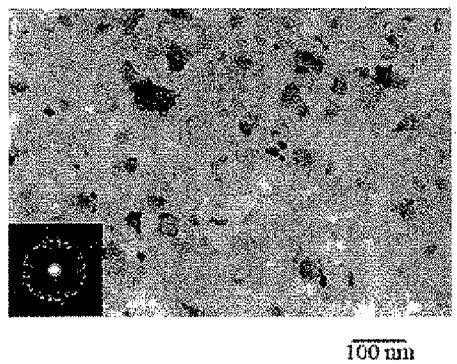
FIG. 4 is a characteristic diagram that shows both TEM and electron diffraction indicating the crystal structure of rapid-solidified $Pr_9Fe_{74-x}Co_9V_1Nb_1B_7$ magnet film that has been crystallized.

FIG. 4 is the characteristic diagram of TEM (Transmission Electron Microscope) and electron diffraction that shows the crystallized structure of the magnetic film of the rapid-solidified $Pr_9Fe_{74-x}Co_9V_1Nb_1B_7$ that has been crystallized. The average crystallized particle size shown in FIG. 4 is 23 nm. Since ring-shaped spots of the electron diffraction are randomly dispersed, it can be said that these fine crystallization are isotropic.

Then, when polyether (Formula 1) is 100 wt. %, condensate (Formula 4) of bisphenols and epichlorohydrin is 10 wt.

%, the isocyanate equivalence (—N═C═O equiv.) of 4,4'-diphenylmethanediisocyanate regeneration body to which 2 mol of methylethylketoneoxime is added is prepared, and alcoholic hydroxyl group equivalence (—OH equiv.) of polymer is prepared, MIBK (methylisobutylketone) solution (30% of solid content) of the resin composition according to the present invention is prepared. Here, in the MIBK solution, proportion is made that its equivalence ratio (—N═C═O/—OH) is made to be 0.4.

Next, the rapid-solidified $Pr_9Fe_{74-x}Co_9V_1Nb1B_7$ magnet film is directly dipped into the organic solvent of the resin composition according to the present invention. The magnet film is air-dried and then baked so as to obtain a self-bonding layer film, the thickness of which is 3 μm to 5 μm.

By using an opposed-dies punching pattern where clearance defined between the punch 2 and the die 5 (see FIG. 2) is set to be 4 μm that is less than one tenth of the thickness of the magnet film 1a, the self-bonding magnet film according to the present invention is punched to have a solid configuration. Here, in the punching operation, the self-bonding magnet film is first fixed by means of the projected die 4 and the die 5. Next, the self-bonding magnet film having the diameter of 1.6 mm that is pinched by an ejector 3 and the punch 2 is punched. The above operation has been performed in succession. In-plane magnetization of 4.8 MA/m pulse is performed on the self-bonding magnet film, one side thereof has approximately 2 mm. The magnetic properties of the self-bonding magnet film after the magnetization have been determined as that remanence Mr is 0.95 T, coercivity HcJ is 652 kA/m, maximum energy product $(BH)_{max}$ is 140 kJ/m$^3$. These values are nearly identical with the in-plane magnetic properties of magnet films following heat treatments. There can not be found any deterioration of coercivity HcJ.

The self-bonding magnet film is then laminated at the pressure of 10 MPa at 160° C. so as to obtain the laminated magnet film of the present invention where its relative density RD exceeds 85% or 90%. Here, methylethylketoneoxime will be thermally dissociated at 160° C. The disengaged isocyanate group is then crosslinked with the alcohol hydroxyl group of polymer so as to produce integrally rigidified laminated magnet films.

Figure 5:
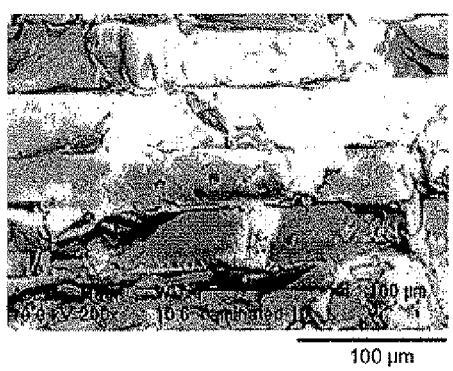
FIG. 5 is a structural drawing observed by SEM (Scanning Electron Microscope) that shows the laminated condition of ruptured surfaces of the laminated magnet film according to the embodiment of the present invention.

FIG. 5 is a structural drawing that shows the laminated condition of ruptured phase for the laminated magnet film of the present invention in which to be observed by SEM (Scanning Electron Microscope). As clearly shown in FIG. 5, it appears to be impossible to obtain bonded magnets with the relative density RD of more than 80% where magnetic powders are compressed along with resin at 1000 MPa or more in general. However, in the present invention, it can easily obtain the considerable high level of the relative density RD with considerably low pressure of 10 MPa.

Figure 6:
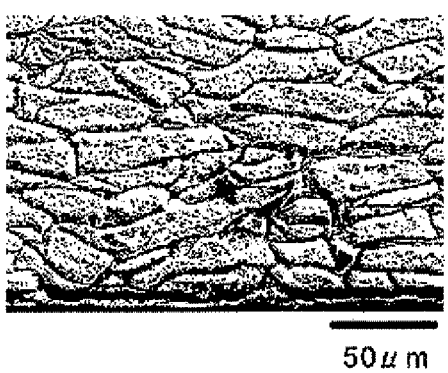
FIG. 6 is a laminating section view of a full-dense magnet with the relative density of approximately 100% made as that: amorphous rapid-solidified flakes are powdered; DC pulse voltages are applied to the powder under decompressed condition; the surface of the powder is purified by means of non-equilibrium plasma treatments; temperature is raised under compression pressure; and its amorphous phase is crystallized at the same time of being plastically deformed so as to deposit $Nd_2Fe_{14}B$ phase.

Still further, FIG. 6 shows the laminated section view of a full-dense magnet. Specifically, $Nd_{13.5}Fe_{64.5}Co_{16}B_6$ amorphous rapid-solidified film, the thickness of which is 30 to 40 μm, is pulverized into flaky powders, the diameter of which is 150 μm or less. 45 mg of the flaky powders are then filled in a cavity that has its diameter of 5 mm and that is formed by a Sialon ($Si_3N_4.Al_2O_3$)-made die and BN (boron nitride)-coated graphite electrodes. DC pulse voltages (10V or less) are applied to the flaky powders under the decompression of $10^{-2}$ Torr through the graphite electrodes. The surface of the flaky powders is then purified through non-equilibrium plasma treatments by glow discharge between the powders. The temperature of the flaky powders is increased up to 700° C. with Joule heating under the compression pressure of 30 MPa. By plastic deformation as well as amorphous phase crystallization, the full-dense magnet having the relative density of roughly 100% and having $Nd_2Fe_{14}B$ phase precipitated can be produced.

In FIG. 6, the end portions of the flaky powders are plastically deformed so as to be full density. At this time, the easy axis (C-axis) of $Nd_2Fe_{14}B$ phase is rotated into a pressure axis direction so as to develop anisotropy in the pressure axis direction. Accordingly, even if the relative density RD is enhanced in the above method, remanence Mr in a radial direction will be decreased so as to be less than half of the saturation magnetization Ms 1.6 of $Nd_2Fe_{14}B$ phase, that is 0.8 T or less. In addition, in order to form a bulk in this method, it would be necessary to have a rare-earth element R more than $R_2Fe_{14}B$ stoichiometry thereby not being able to provide nanocrystalline structures composed of soft magnetic phases and hard magnetic phases that have a high remanence Mr.

Contrary to the above method, in the laminated magnet film according to the present invention, as clearly understood from the laminated structures shown in FIG. 4, the C-axis rotation becomes not necessary in a bulk formation. Thus, the reduction of radial remanence Mr will not occur. That is, when the radial remanence Mr (flaky) of the magnetic films is 0.96 T like the embodiment of the present invention, the radial remanence Mr (laminated) of the laminated magnet film becomes 0.81 T (0.96×0.85) at the relative density of 85%. Accordingly, it has advantage that remanence Mr of a magnet that has the relative density of 100% and that has $Nd_{13.5}Fe_{64.5}Co_{16}B_6$ amorphous rapid-solidified film sintered through plasma activation exceeds 0.8 T. After rapid-solidified $Pr_9Fe_{74-x}Co_9V_1Nb_1B_7$ magnet films that have been crystallized have been pulverized into powders, the diameter of which is less than 150 μm, the powders are mixed with liquid epoxy resins of 2 wt. %. The mixed powders are then compressed at 700 MPa to 1200 MPa so as to obtain a bonded magnet having the diameter of approximately 1.6 mm.

Figure 7:
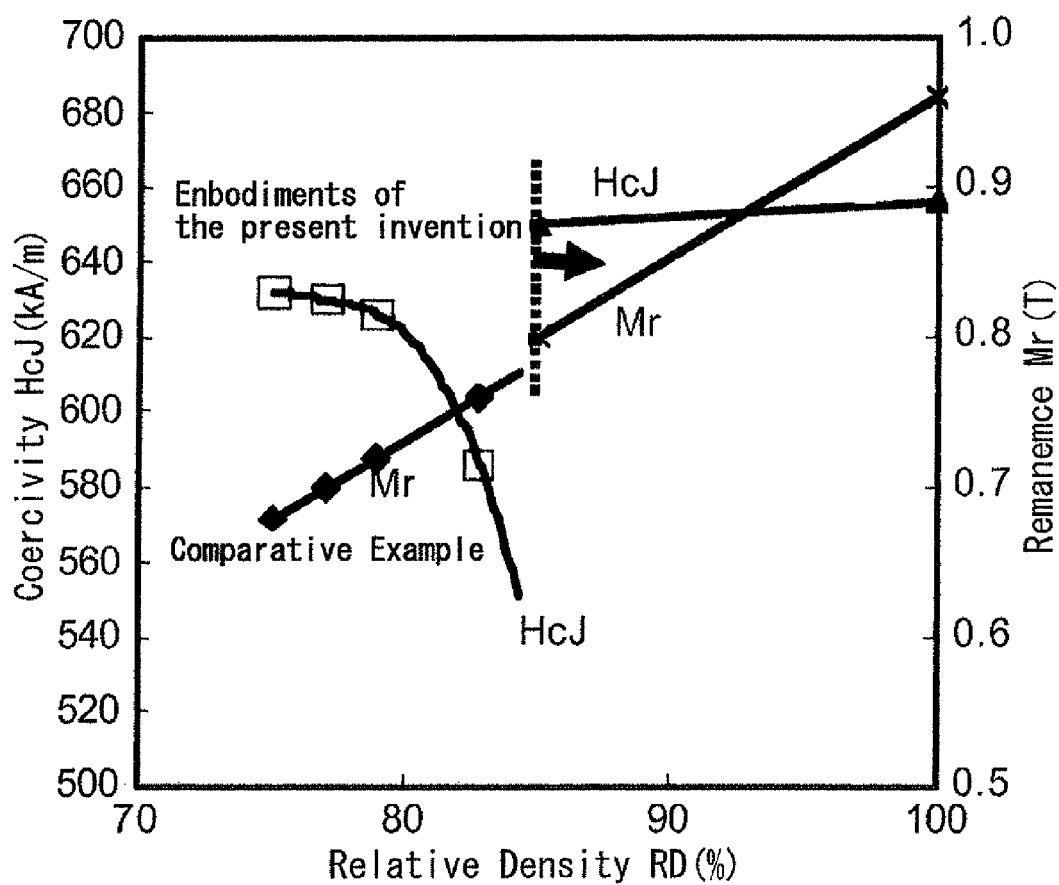
FIG. 7 is a characteristic drawing showing that coercivity HcJ and remanence Mr of a magnet film, a laminated magnet film according to the present invention after pulsed magnetization of 4.8 MA/m, and coercivity HcJ and remanence Mr of a bonded magnet having a different relative density RD according to a comparative example following 4.8 MA/m pulse magnetization are plot according to relative density RD.

FIG. 7 is a characteristic drawing showing that coercivity HcJ and remanence Mr of a magnetic film, a laminated magnet film according to the present invention following 4.8 MA/m pulse magnetization, and coercivity HcJ and remanence Mr of a bonded magnet having a different relative density RD according to a comparative example following 4.8 MA/m pulse magnetization are plot according to relative density RD. As clearly shown in FIG. 7, if crystallized magnet films are pulverized into flaky powders, the diameters of which are less than 150 μm, its coercivity HcJ will decrease. Further, in order to improve remanence Mr of a bonded magnet where the flaky powders have been bonded with resin, if the flaky powders are compressed at 1200 MPa so as to enhance its relative density RD up to its limit of this system, the flaky powders are broken into fragmentation due to densification, thereby notably reducing coercivity HcJ. On the contrary, in the present invention, the magnet films are not pulverized but directly formed into the self-bonding magnet films (solid or hollow). The solid or hollow self-bonding magnet films are then laminated so as to make a bulk whereby there cannot be found any notable reduction of coercivity HcJ. Further, for integrally rigidifying the laminated magnet films, necessary pressure is roughly 50 MPa.

What is claimed is:
1. A manufacturing method of a laminated magnet film end product, comprising the steps of:
   a first step of preparing magnet films, each of the magnet films having a thickness of 40 μm to 300 μm, and having a nanocrystalline structure which is magnetically isotropic;

a second step of applying a self-bonding resin composition with film formability on each of the magnet films so as to prepare a plurality of self-bonding magnet films, each being composed of a magnet film and a self-bonding layer;

a third step of mechanically processing each of the plurality of the self-bonding magnet films so as to be solid or hollow disc;

a fourth step of preparing a laminated magnet film by laminating the plurality of self-bonding magnetic films;

a fifth step of melting each self-bonding layer of the laminated magnet film and then cooling and solidifying each self-bonding layer so as to integrally rigidify the laminated magnet film; and a sixth step of magnetizing the rigidified laminated magnet film.

2. The manufacturing method of the laminated magnet film end product according to claim 1, wherein the first step is further defined as that a metallic structure of each of the magnet films is fabricated to have a nanocrystalline structure by that: R-TM-B (R is either Nd or Pr, and TM is either Fe or Co) based molten alloy treated to have rapid solidification, or R-TM-B (R is either Nd or Pr, and TM is either Fe or Co) based alloy is treated to be filmed by means of a physical deposition; the treated alloy is then subjected to heat treatment for crystallization; and the magnet film is made to have the nanocrystalline structure where $R_2TM_{14}B$ phase of the magnet film is provided with hard magnetic properties.

3. The manufacturing method of the laminated magnet film end product according to claim 1, wherein the first step is further defined as that a metallic structure of each of the magnet films is fabricated to have a nanocrystalline structure by that: a rapid-solidified film of R-TM-B (R is either Nd or Pr, and TM is either Fe or Co) based molten alloy is subjected to heat treatment; and the magnet film is fabricated to have α-Fe phase and $R_2TM_{14}B$ phase (R is either Nd or Pr, and TM is either Fe or Fe partially substituted by Co).

4. The manufacturing method of the laminated magnet film end product according to claim 1, wherein the sixth step is further defined as that magnetic properties of each of the magnet films have coercivity HcJ of 600 kA/m or more and remanence Mr of 0.9 T or more following pulse magnetization of 4 MA/m.

5. The manufacturing method of the laminated magnet film end product according to claim 1, wherein the first step is further defined as that a metallic structure of each of the magnet films is fabricated to have a nanocrystalline structure by that a rapid-solidified film of $Pr_9Fe_{74-x}Co_9V_1NbxB_7$ (x=1 to 3) molten alloy is subjected to heat treatment.

6. The manufacturing method of the laminated magnet film end product according to claim 1, wherein the first step is further defined as that a metallic structure of each of the magnet films is fabricated to have a nanocrystalline structure which is composed of $Fe^3B$ phase, α-Fe phase or $R_2TM_{14}B$ phase (R is either Nd or Pr, and TM is either Fe or Fe partially substituted by Co).

7. The manufacturing method of the laminated magnet film end product according to claim 1, wherein the sixth step is further defined as that magnetic properties of each of the magnet films have coercivity Ha of 300 kA/m or more and remanence Mr of 1.1 T or more following pulse magnetization of 4 MA/m.

8. The manufacturing method of the laminated magnet film end product according to claim 1, wherein the first step is further defined as that a metallic structure of each of the magnet films is fabricated to have a nanocrystalline structure by that a rapid-solidified film of $Ndr_{4.5}Fe_{70}CO_5B_{18.5}Cr_2$ molten alloy is subjected to heat treatment.

9. The manufacturing method of the laminated magnet film end product according to claim 1, wherein the second step is further defined as that a main component of the self-bonding resin composition includes at least one polymer that has a functional group reactable to an isocyanate group.

10. The manufacturing method of the laminated magnet film end product according to claim 9, wherein a blocked-isocyanate is added into the self-bonding resin composition.

11. The manufacturing method of the laminated magnet film end product according to claim 1, wherein the second step is further defined as that the laminated magnet film is integrally rigidified by which each self-bonding layer is cross-linked.

12. The manufacturing method of the laminated magnet film end product according to claim 1, wherein the third step is further defined as that the mechanical processing for each of the plurality of self-bonding magnet films is conducted through a punching work by an opposed dies method.

13. The manufacturing method of the laminated magnet film end product according to claim 1, wherein the second step is further defined as that the laminated magnet film is fabricated so as to make a relative density of each of the magnet films in 100% of the laminated magnet film to be 85% or more.

14. The manufacturing method of the laminated magnet film end product according to claim 1, wherein the sixth step is further defined as that the magnetization is performed along an in-plane direction of the laminated magnet film so as to have at least double pole pairs.

15. A radial air-gap type rotary electrical machine wherein the laminated magnet film end product manufactured by the method recited in claim 1 is magnetized so as to have at least double pole pairs; and a rotary shaft is installed into the laminated magnet film end product so as to be applicable as a brushless motor.

16. A radial air-gap type rotary electrical machine wherein the laminated magnet film end product manufactured by the method recited in claim 1 is magnetized so as to have at least four pole pairs; and a rotary shaft is installed into laminated magnet film end product so as to be applicable as a stepping motor.

* * * * *